United States Patent [19]
DeLuca et al.

[11] 3,906,014
[45] Sept. 16, 1975

[54] 3-DEOXY-1α-HYDROXYCHOLECALCIFEROL

[75] Inventors: Hector F. DeLuca, Madison; Heinrich K. Schnoes, Waunakee; Hing-Yat Lam, Madison, all of Wis.

[73] Assignee: Wisconsin Alumni Research Foundation, Madison, Wis.

[22] Filed: June 17, 1974

[21] Appl. No.: 480,211

[52] U.S. Cl. .............................................. 260/397.2
[51] Int. Cl.² .............................................. C07J 9/00
[58] Field of Search ................................... 260/397.2

[56] References Cited
UNITED STATES PATENTS

| | | | |
|---|---|---|---|
| 3,585,221 | 6/1971 | DeLuca | 260/397.2 |
| 3,833,622 | 9/1974 | Babcock et al. | 260/397.2 |
| 3,847,955 | 11/1974 | DeLuca | 260/397.2 |

*Primary Examiner*—Elbert L. Roberts
*Attorney, Agent, or Firm*—Howard W. Bremer

[57] ABSTRACT

3-deoxy-1α-hydroxycholecalciferol. The compound is characterized by vitamin D-like activity.

3 Claims, No Drawings

3-DEOXY-1α-HYDROXYCHOLECALCIFEROL

The invention described herein was made in the course of work under a grant or award from the Department of Health, Education, and Welfare.

This invention related to a compound which exhibits vitamin D-like activity.

More particularly, this invention relates to a derivative of vitamin $D_3$.

The D vitamins, particularly vitamins $D_2$ and $D_3$ have long been known and applied for their effect upon deficiency type diseases involving calcium metabolism such as, for example, rickets. In more recent years various derivatives of the D vitamins have been discovered which exhibit an antirachitic effect greater than that exhibited by vitamin $D_2$ or $D_3$. Other derivatives of vitamin $D_2$ and $D_3$ have been discovered which show more specific activity in calcium metabolic activity such as enhancing calcium transport in the gut or increasing or decreasing bone calcium mobilization.

A new derivative of vitamin $D_3$ has now been synthesized which exhibits vitamin D-like activity in promoting intestinal calcium transport and in increasing bone calcium mobilization. This vitamin $D_3$ derivative has been identified as 3-deoxy-1α-hydroxycholecalciferol.

SYNTHESIS

In the following description identification of the various intermediate compounds and of the 3-deoxy compound claimed was established utilizing the following instrumentation, carriers and analytical reagents and aids.

Also, like numbers identify identical compounds in the description and in the process schematics which follow.

For column chromatography silicic acid (Mallinckrodt Chemical Co., 100 mesh), neutral alumina (Bio-Rad minus 200 mesh, California Corp. for Biochemical Research, Los Angeles, Calif.) or Sephadex LH-20 (a hydroxypropyl ether derivative of a polydextran marketed by Pharmacia Fine Chemicals, Inc., Piscataway, N.J.) was used. Thin layer plates were coated with Merck silica gel G and air dried. Sulfuric acid spray or iodine vapor was used for visualization of spots. Skellysolve B (essentially normal hexane, derived from petroleum oil, marketed by Skelley Oil Co.) for reactions and chromatography was redistilled and the fraction boiling at 67°–69° was used. Melting points were determined on a hot stage and are uncorrected. Infrared spectra (ir) were recorded on a Beckman Instruments, Inc. model IR-5 instrument; ultraviolet spectra (uv) were obtained with a Beckman Instruments, Inc. model DB-G spectrophotometer. Mass spectra were determined with an Associated Electrical Industries model MS-902 double focussing mass spectrometer. Electron impact ionization at 70 eV was used. Perfluorotributylamine was used as standard for accurate mass measurements. Nuclear magnetic resonance (nmr) spectra were measured on a Varian Associates model T-60 instrument and data are given in p.p.m. (δ) downfield from tetramethylsilane as internal standard. Gas liquid chromatography (glc) was performed on an F & M model 402 instrument (Hewlett-Packard Co., Avondale, Pa.), using 4 ft. × ¼ in. glass columns packed with 3% SE30 on 100–120 mesh Gas Chrom Z (a silicone oil on a ceramic carrier available from Hewlett Packard Co.) utilizing a column temperature of 250° C and an outflow rate of 80 ml/min. Microanalyses were performed by Micro-Tech Laboratories, Inc., Skokie, Illinois.

A stirred solution of cholesterol (1, 60 g) in 240 ml glacial acetic acid was treated dropwise with 4.5 ml fuming nitric acid. The mixture was then cooled in an ice-salt bath and additional fuming nitric acid (390 ml) was added over a 1 hr period and stirring was continued for another 0.5 hr. The reaction mixture was then rapidly filtered by suction, the filter cake was taken up in 570 ml glacial acetic acid and after additional of 107 ml $H_2O$ and Zn dust (71 g) heated for 1 hr on a steam bath. After refluxing for an additional 10 hr period the reaction mixture was diluted with $H_2O$ and extracted with diethyl ether. The ether layer was separated and evaporated to dryness. To the residue, 400 ml of 100% ethanol and 85 ml concentrated HCl were added and the solution refluxed for 2 hr. Enough $H_2O$ was then added to induce slight turbidity, and the product allowed to crystallize. Recrystallization from aqueous ethanol yielded 25 g (yield 40%) of pure 3β-hydroxy-5α-cholestan-6-one(2): m.p 142.5°–144°; mass spectrum: m/e 402 $M^+$, 100% and m/e 387 (8%), 384 (7%), 369 (7%), 331 (6%), 289 (17%), 262 (9%), 247 (17%), 248 (17%); ir ($CHCl_3$) 1712 (C=O), 3400 (OH) $cm^{-1}$; Anal. calcd, for $C_{27}H_{44}O_2$: C, 80.54; H, 11.41; found: c, 80.52; H, 11.62.

15 grams of 3β-hydroxy-5α-cholestan-6-one was dissolved in redistilled (67°–69°) Skellysolve B. To this solution freshly distilled ethylene glycol (50 ml) and p-toluenesulfonic acid monohydrate (100 mg) were added in a one-liter round bottom flask fitted with a Dean-Stark trap, and the mixture was refluxed for 22 hr with periodic draining of the trap. Mass spectral analysis of the reaction mixture at this time indicated that no starting material was present. To the cooled solution sodium acetate (0.3 g) was added, the hexane layer was decanted, diluted with a small amount of ether and washed three times with a 2% sodium acetate solution. The ethylene glycol layer, diluted with $H_2O$, was extracted with ether, and this ether phase after washing with 2% sodium acetate solution was combined with the ether-hexane layer and evaporated in vacuo. The white residue, recrystallized from ethyl acetate gave 12.6 g (76%) of 6,6-ethylenedioxy-5α-cholestan-3β-ol (3). m.p. 114°–115°; mass spectrum: m/e 446 ($M^+$, 26%, $C_{29}H_{50}O_3$ requires 446, 291 (100%), 183 (25%); nmr ($CDCl_3$) δ 3.90 (m, ketal); ir (KBr) 3350 $cm^{+1}$ (OH); Anal. calcd, for $C_{29}H_{50}O_3$: C, 77.97; H, 11.28; found: C, 77.79; H, 11.49.

A solution of 6-ethylenedioxy-5α-cholestan-3β-(3, 12.5 g) in pyridine was added to ice-cold pyridine-$CrO_3$ complex prepared by adding $CrO_3$ (182 g) to ice-cold pyridine (182 ml). An additional amount of pyridine (90 ml) was utilized for complete transfer. The mixture was allowed to come to room temperature and stirred for 10 hr. It was then brought to a volume of 500 ml with ethyl acetate and filtered through a column packed with Celite (a diatomaceous silica product marketed by Johns-Manville Co.) (50 g, 4 cm diameter) slurried in ethyl acetate. Material eluted with a total of 750 ml of ethyl acetate was collected, and filtered through a 6 cm column packed with alumina (100 g) slurried in ethyl acetate. After elution with 1200 ml of ethyl acetate and evaporation of the solvent, a greenish solid was recovered. This was applied to a 2 × 23.5 cm (50 g alumina, AG-7 minus 200 mesh) column and eluted with ethyl acetate. The first 150 ml of eluant gave 12.3 g (98%) of pure 6,6-ethylenedioxy-5α-cholestan-3-one (4). An analytical sample recrystallized from MeOH was obtained as white crystals: m.p. 115°–116°; nmr (CDCl$_3$) δ 2.35 (m, C-2 and C-4 protons), 3.9 (m, ketal); ir (KBr) 1710 cm$^{+1}$ (C=O); mass spectrum: m/e 444 (M$^+$, 19%, C$_{29}$H$_{48}$O$_3$: C, 78.33; H, 10.88; obs: C, 78.37; H, 10.93.

To a solution of 10.9 g of ketone 4 in 218 ml THF cooled to 9°, a solution of 1.21 g KOAc and 1.31 ml Br$_2$ in 12.3 ml acetic acid was added dropwise with stirring, allowing the solution to decolorize between additions. The solution was then poured into 200 ml of cold 2% NaOAc solution, and the product extracted into ether. The product, according to tlc, consisted of ca. 50% bromo compound and 50% starting material. After evaporation of the solvent, the residue was taken up into methanol/CH$_2$Cl$_2$ (1:1) from which upon standing 3.91 g of the 2-bromo compound (5) separated: mass spectrum, m/e 524, 522 (M$^+$), 443 (M$^+$—Br), 291; nmr (CDCl$_3$) δ 4.8 (dd, J=6, 14 Hz, C-2-H), 3.9 (ketal).

Crude 5 (3.91 g) was added to 3.1 g CaCO$_3$ in 39 ml boiling DMA. Reflux was continued for 15 min, the mixture diluted with ether and thoroughly extracted with H$_2$O. Evaporation of the ether gave a pale yellow solid which was applied to an activated silicic acid column (150 g). Elution with 20% ethyl acetate in Skellysolve B (5 ml fractions) gave in fraction 42–54, Δ$^1$ compound,6,6-ethylenedioxy-5α-cholest-1-ene-3-one (6), as an amorphous solid (2.7 g, 25% from 4) but homogeneous on tlc (R$_f$ - 0.62), 1:3 ethyl acetate/cyclohexane): uv (95% EtOH)λ$_{max}$ 227 nm (ε8340); ir (CHCl$_3$) 2920, 1675 cm$^{-1}$, nmr (CDCl$_3$) δ7.12 (1H, d, J=10Hz), 5.85 (1H, d, J-10Hz), 3.9 (4H, m, ketal); mass spectrum, m/e (rel. int.) 442 (M$^+$, 36%), 291 (100%); high resolution mass spectral Anal. calcd. for C$_{29}$H$_{46}$O$_3$: 442.3447; found: 442.3452.

To 2.09 g Δ$^1$-steroid (6) in 25 ml dioxane, 6 ml of 1N NaOH and 4.25 ml of 30% H$_2$O$_2$ were added. After standing for 20 hr at room temperature, water was added, and the solution was extracted several times with benzene and ether. The residue remaining after evaporation of the combined organic phases was applied to a silicic acid solumn (30 g) and eluted (as 11 ml fractions) first with 10% ethyl acetate in Skellysolve B, then with 20% ethyl acetate in Skellysolve B, giving 1.4 g (65%) of the epoxide, 6,6-ethylenedioxy-1α,2α-epoxy-5α-dholestan-3-one (7). Crystallization from Skellysolve A and then from methanol gave material of m.p. 98.5°–100°; nmr (CDCl$_3$) δ3.9 (m, 4H), 3.46 (d, 1H, J=4.2 Hz), 3.2 (d, 1H, J=4.2Hz); high resolution mass spectrum, m/e (rel. int.) 458.3396 (22%, M$^+$, calcd. for C$_{29}$H$_{46}$O$_4$: 458.3396), 291 (100%); Anal. calcd. for C$_{29}$H$_{46}$O$_4$: C, 75.94; H, 10.11; found: C, 75.71; H, 10.27.

A solution of 2.0 g of epoxide 7 in 15 ml of hydrazine hydrate was refluxed for 15 min, then diluted with 50 ml H$_2$O, and extracted three times with ether. The ether layer was washed with 20 ml H$_2$O, dried over Na$_2$SO$_4$ and evaporated. The residue was applied to a silicic acid column (180 g) in Skellysolve B. Elution with mixtures of ethyl acetate/Skellysolve B(200 ml of 2% ethyl acetate in Skellysolve B, followed by 200 ml of 5%, 300 ml of 10%, 200 ml of 15%, 600 ml of 20% and finally 200 ml of 30% ethyl acetate in Skellysolve B) gave (in the 20% ethyl acetate solvent) 720 mg of the oily 1α-hydroxy compound, 6,6-ethylenedioxy-1α-hydroxy-5α-cholest-2-ene (8), which was homogeneous on tlc. After several weeks at −4°C, this oily compound solidified, m.p. 84°–90°C; nmr (CDCl$_3$) δ3.66 (1H, m, C-1), 3.93 (4H, m, ketal), 5.85 (2H, m, C-2,3); mass spectrum, m/e (rel. int.): 444 (66, M$^+$), 375 (95), 291 (100).

A solution of 720 mg of the 1α-hydroxy compound 8 in 60 ml cyclohexane was hydrogenated under 1 atm H$_2$ at room temperature for 4 hours, using 700 mg 5% Pd/C as catalyst. The solution was then filtered, the filtrate evaporated to dryness and the residue recrystallized from Skellysolve B to give 660 mg (92% yield) of 6,6-ethylenedioxy-1α-hydroxy-5α-cholestane (9); m.p. 96°–98°C; nmr (CDCl$_3$) δ3.65 (m, 1H, C-1), 3.93 (4H, m, ketal); ir (CHCl$_3$) 3480 cm$^{-1}$ (OH), 1205-1400 cm$^{-1}$ (4 bands, ketal) mass spectrum m/e (rel. int.): 446 (39, M$^+$), 291 (100). Anal. calcd. for C$_{29}$H$_{50}$O$_3$: C, 77.94; H, 11.28; found: C, 78.07; H, 11.54.

Ketal 9 (660 mg) was dissolved in 8 ml of MeOH and 10 ml 95% EtOH containing 40 mg p-toluene sulfonic acid monohydrate was added. This solution was stirred at room temperature for 16 hours. Then a 5% NaHCO$_3$ solution was added and after extraction with ether, drying (Na$_2$SO$_4$) and evaporation of the solvent, the residue was recrystallized from methanol/ether to give colorless crystals of m.p. 181°–183° (quantitative yield). nmr (CDCl$_3$) δ3.75 (m, 1H, C-1); ir (CHCl$_3$) 3480 (OH), 1700 cm$^{-1}$ (C=O); mass spectrum, m/e (rel. int.): 402 (83, M$^+$), 384 (86), 369 (20), 367 (23), 331 (49), 289 (43), 271 (23), 247 (23), 229 (60) identifying 1α-hydroxy-5α-cholestan-6-one (10).

The 1α-alcohol 10 was acetylated in 12 ml of Ac$_2$O and 2 ml of pyridine at 50°C for 36 hours. After addition of 25 ml of H$_2$O the product was extracted into ether. Drying (Na$_2$SO$_4$) and evaporation of the ether gave after recrystallization of the residue from hot methanol, 400 mg white crystals 1α-acetoxy-5α-cholestan-6-one (11) m.p. 104°–105°; nmr (CDCl$_3$) δ2.13 (s, 3H, C-1-OAc), 4.98 (m, 1H, C-1); ir (CHCl$_3$); 1710, 1730 cm$^{-1}$ (ketone and acetate); mass spectrum, m/e rel. int.): 444 (49, M$^+$), 384 (84), 366 (48), 229 (26). Anal. calcd. for C$_{29}$H$_{48}$O$_3$: C, 78.33; H, 10.88; found: C, 77.56; H, 11.04.

To a solution of 300 mg of compound 11 in 20 ml of isopropanol, 64 mg of NaBH$_4$ (2.5 x mole) dissolved in 5 ml of isopropanol was added. After stirring at room temperature for 16 hours, 20 ml of H$_2$O containing 1 drop of 3% H$_2$SO$_4$, was added. Extraction with ether (3 ×) drying (Na$_2$SO$_4$) and evaporation of the combined ether layers, gave a residue which was chromatographed on silicic acid (15 g). Elution with 20% ethyl acetate in Skellysolve B yielded 260 mg of the pure 6β-alcohol-1α-acetoxy-5α-cholestan-6β-ol (12). Crystallization from McOH gave white needles, m.p. 127°–128°C; nmr (CDCl$_3$) δ2.06 (s, 3H, C-1-OAc), 3.86 (m, 1H, C-6), 4.75 (m, 1H, C-1); ir (CHCl$_3$): 3480, 1725 cm$^{-1}$ (OH, acetate); mass spectrum m/e (rel. int.): 446 (1.2, M$^+$), 428 (13), 386 (39), 368 (100), 255 (25), 231 (23), 228 (52), 213 (45).

To an ice-cold pyridine solution (0.5 ml) of 255 mg of the alcohol 12, 0.8 ml of POCl$_3$ was added dropwise. The solution was then kept at room temperature for 5½ hours. After addition of ice-water, the solution was extracted with ether (3 ×). The combined ether fractions were dried over Na$_2$SO$_4$ and evaporated. The residue was applied to a 10 g silicic acid column in Skellysolve B. Elution with 60 ml Skellysolve B and then 10% ethyl acetate in Skellysolve B gave in fractions 10–12 (8-ml fractions) the compound 1α-acetoxy-cholest-5-ene (13) (yield 230 mg). Crystallization from ethanol produced white crystals of m.p. 65°–66°C; nmr (CDCl$_3$) δ2.05 (s, 3H, C-1-OAc), 4.98 (m, 1H, C-1), 5.45 (m, 1H, C-6); ir (CHCl$_3$): 1725 cm$^{-1}$ (acetate); mass spectrum m/e (rel. int.): 368 (100, M$^+$-60), 255 (39), 247 (34), 219 (24), 213 (28). Anal. calcd. for C$_{29}$H$_{48}$O$_2$: C, 81.25; H, 11.29; found: C, 81.42; H, 11.38.

The 1-acetoxy compound 13 (150 mg) dissolved in 2 ml of Skellysolve B and 2 ml of benzene, was treated with N,N'-dibromo-5,5-dimethyl hydantoin. The solution was kept at 70° for 10 min., then cooled in an ice bath for 5 min., and filtered. The filtrate was taken up in 2 ml of xylene and added dropwise to a preheated solution of 0.25 ml trimethyl phosphite in 1 ml xylene at 135°. After 1.75 lhours at 135°, the solvent was evaporated under reduced pressure and the products were separated on a column of alumina (10 g). Elution with 5% ether in Skellysolve B furnished 9.3 mg (6.2% yield) of the 7-dehydrocholesterol derivative 1α-acetoxy-5,6-cholestadiene (14). Ultraviolet spectrum (ethanol) λ$_{max}$ 295, 283, 273 nm; mass spectrum, m/e (rel. int.): 426 (12, M$^+$), 366 (100), 351 (23), 253 (24), 226 (26), 211 (61), 199 (44).

An ether solution (200 ml) of 2.3 mg of the Δ$^{5,7}$-compound 14 was irradiated for 1.5 min at 0°C. The products were separated on a column of AgNO$_3$-impregnated silicic acid (5 g) prepared as a slurry in Skellysolve B. Elution with 5% ether in Skellysolve B gave two main fractions. The nonpolar fraction (tube No. 8-11; 3.2-ml fractions), exhibiting uv absorption at λ$_{max}$ 260 nm and λ$_{min}$ 235 nm, contained the desired pre-vitamin D derivative. Warming for 3 hours in ethanol under N$_2$ produced an enhancement of the optical density indicating isomerization of the pre-vitamin to the vitamin skeleton. The mixture was then saponified with two drops of 0.9 N KOH in methanol at 60° for 10 min. Addition of water, extraction with CHCl$_3$, drying of the CHCl$_3$ phases and evaporation, gave after chromatography of the residue on LH-20 (20 g) and elution with CHCl$_3$:Skellysolve B (1:1), the desired product, 3-deoxy-1α-hydroxycholecalciferol (15). uv (ethanol) λ$_{max}$ 264.5 μm; λ$_{min}$ 229 mμ; mass spectrum, m/e (rel. int.): 384 (19, M$^+$), 366 (8), 271 (7), 253 (7), 136 (100).

SCHEME I

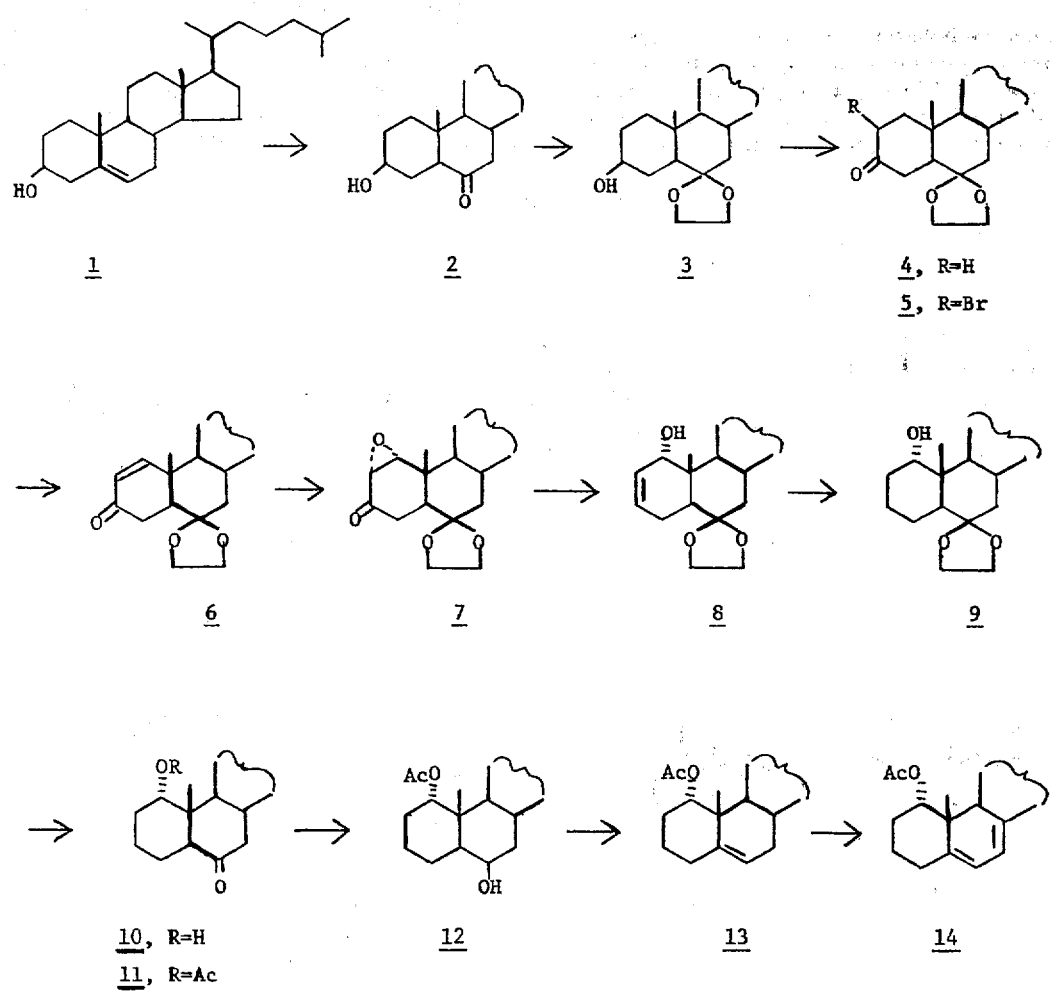

—Continued

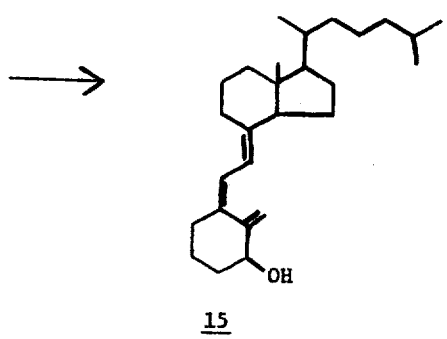

15

An alternative method for preparing 3-deoxy-1α-hydroxycholecalciferol is set forth in the following description and in the following process schematic where like numbers identify like compounds.

A solution of 600 mg of 1α-hydroxycholesterol diacetate (16) in 1.6 ml of diethyl ether was cooled to icebath temperature and 1.6 ml of 0.1N KOH in methanol was added slowly with stirring. After stirring for 2.5 hours, acetic acid (0.25 ml) and water was added, the mixture was extracted with ether (3 ×), combined extracts were dried (Na$_2$SO$_4$) and evaporated to dryness to give 0.55 g of 1α-acetoxycholesterol (17), homogeneous on tlc. nmr (CDCl$_3$) δ5.55 (1H, broad, C-6), 5.00 (1H, m, C-1), 3.62 (1H, m, C-3), 2.10 (3H, s, OAc).

The 1α-acetoxycholesterol (17) was dried by dissolution in benzene, evaporation of solvent and further drying under vacuum. The amophous material (0.55 g) was then taken up in pyridine, 0.6 g of toluene sulfonyl chloride was added, the mixture purged with nitrogen gas and stirred at room temperature for 15 hours. Addition of 50 ml of 4% aqueous KHCO$_3$ and 50 ml of ether followed by further extraction with ether, washing of the ether extracts with 2% HCl, drying (Na$_2$SO$_4$) and finally evaporation of solvent gave 1α-acetoxycholesterol tosylate (18); nmr (CDCl$_3$) δ7.82, 7.38 (4H, aromatic H), 5.50 (1H, m, C-6), 4.90 (1H, m, C-1); 3.75 (1H, m, C-3), 2.49 (3H, s, tosylate methyl), 1.98 (3H, s, OAc).

A solution of 0.900 mg of the tosylate 18 in 50 ml of benzene was stirred and purged with N$_2$. Upon addition of 2.3 ml of Vitride reagent (a solution of 70% Na bis(2-methoxyethoxy aluminum hydride in benzene, Aldrich Chemical Co.), the mixture was refluxed (80°) for 18 hours. The product was isolated in the usual manner: after addition of water and 1.0 ml of 10% NaOH, the inorganic precipitate was removed by filtration and washed with ether, the aqueous phase was further extracted with ether, and the combined organic extracts were washed (10% NaOH), and dried over Na$_2$SO$_4$ and evaporated in vacuo. Chromatography of this residue on silica gel (using 20% ethylacetate in Skellysolve B) gave pure 1α-hydroxycholest-5-ene (19). nmr (CDCl$_3$) δ5.53 (1H, m, C-6), 3.74 (1H, m, C-1); mass spectrum, m/e 386 (M$^+$), 371, 368, 273.

A solution of 140 mg of compound 19 in 6 ml of dry pyridine was treated with 6 ml of acetic anhydride and refluxed overnight. The solution was evaporated to dryness and the residue was chromatographed on a silica gel column using Skellysolve B as the solvent. Pure 1α-acetoxy-cholest-5-ene (13) was recovered.

Conversion of the 1α-acetoxycholest-5-ene to 3-deoxy-1α-cholecalciferol, i.e. conversion of compound 13 to compound 14 to compound 15 was carried out as described above.

SCHEME II

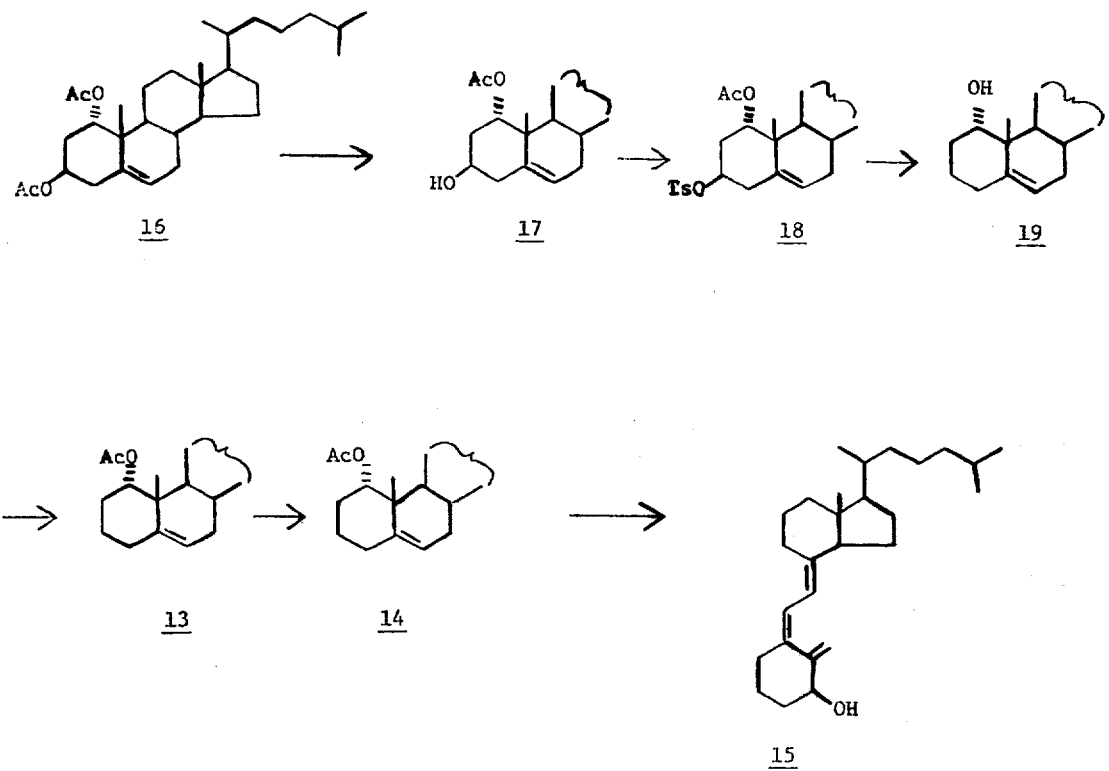

Biological Activity

Male weanling rats were housed in hanging wire cages and fed ad libitum the low calcium vitamin D-deficient diet described by Suda et al (J. Nutr. 100, 1049 (1970)) for 3 1/2 weeks prior to their use in the following assays.

Intestinal Calcium Transport

The rats were divided into groups of 6 with the test rats receiving 0.25 μg of 3-deoxy-1α-hydroxycholecalciferol dissolved in the anal intrajugularly and the control animals receiving 0.05 ml of 95% ethanol. After 12.5 hours all rats were decapitated and the blood and duodena were collected. The duodena were prepared according to the techniques of Martin and DeLuca (Am. J. Physiology 216, 1351 (1969)). Aliquots from serosal and mucosal media were spotted on filter paper discs, dried and placed in 20 ml counting vials containing 10 ml of scintillation solution. Results are shown in the table below.

Table 1

| Material | $^{45}$Ca Serosal/$^{45}$Ca Mucosal |
|---|---|
| Control (ethanol) | 1.9 ± 0.12* |
| 3-deoxy-1α-hydroxycholecalciferol | 3.4 ± 0.4* |

*Average of 6 rats

Calcium Mobilization from Bone

The blood obtained from the rats (see below) was centrifuged and 0.1 ml of the serum obtained was mixed with 1.9 ml of 0.1% NaCl solution. Serum calcium concentration was determined with an atomic absorption spectrophotometer (Perkin-Elmer Model No. 214). Results are shown in Table 2 below.

Table 2

| Material | Serum $Ca^{++}$(mg %) |
|---|---|
| Control (ethanol) | 4.5 ± 0.2* |
| 3-deoxy-1α-hydroxycholecalciferol | 5.8 ± 0.2* |

*Average of 6 rats

It is evident from the above data that 3-deoxy-1α-hydroxycholecalciferol primarily stimulates intestinal calcium transport although it also exhibits activity in stimulating the mobilization of calcium from bone. This indicates that this compound would be a preferred agent for use in chronic renal disease to induce transport and absorption of calcium in the intestine without dissolution of bone.

Having thus described the invention, what is claimed is:

1. 3-deoxy-1α-hydroxycholecalciferol.

2. A method for preparing 3-deoxy-1α-hydroxycholecalciferol which comprises:

converting cholesterol into its 6-keto form, 3β-hydroxy-5α-cholestan-6-one;

converting the said keto form into its corresponding ketal, 6,6-ethylenedioxy-5α-cholestan-3β-ol;

oxidizing the said ketal and recovering 6,6-ethylenedioxy-5α-cholestan-3-one;

subjecting the said 3-ketone to bromination and dehydrobromination in sequence and recovering the Δ$^1$ compound, 6,6-ethylenedioxy-5α-cholest-1-en-3-one;

expoxidizing the said Δ$^1$ compound and recovering 6,6-ethylenedioxy-1α,2α-epoxy-5α-cholestan-3-one;

treating the recovered epoxy compound with hydrazine and recovering the unsaturated alcohol 6,6-ethylenedioxy-1α-hydroxy-5α-cholest-2-ene;

catalytically reducing the recovered unsaturated alcohol to obtain the ketal 6,6-ethylenedioxy-1α-hydroxy-5α-cholestane;

converting the said ketal to the corresponding ketone and acetylating the ketone to obtain 1α-acetoxy-5α-cholestan-6-one;

treating the acetylated compound with a hydride reducing agent and recovering the alcohol, 1α-acetoxy-5α-cholestan-6β-ol;

dehydrating the recovered alcohol and recovering 1α-acetoxycholest-5-ene;

subjecting the recovered 1α-acetoxycholest-5-ene to allylic bromination and dehydrobromination with trimethyl phosphite and recovering 1α-acetoxy-5,7-cholestadiene;

irradiating the said diene with ultraviolet radiation and recovering 3-deoxy-1α-acetoxy precholecalciferol;

thermally promoting isomerization to 3-deoxy-1α-acetoxy-cholecalciferol, hydrolyzing the said compound and recovering 3-deoxy-1α-hydroxycholecalciferol.

3. A method for preparing 3-deoxy-1α-hydroxycholecalciferol which comprises:

hydrolyzing 1α-hydroxycholesterol diacetate and recovering 1α-acetoxycholesterol;

tosylating the recovered compound and extracting 1α-acetoxycholesterol-tosylate from the reaction mixture;

reducing the tosylate with a hydride reducing agent and isolating 1α-hydroxycholest-5-ene from the reduction reaction mixture;

acetylating the isolated compound and recovering 1α-acetoxy-cholest-5-ene;

subjecting the recovered 1α-acetoxycholest-5-ene to allylic bromination and dehydrobromination with trimethyl phosphite and recovering 1α-acetoxy-5,7-cholestadiene;

irradiating the said diene with ultraviolet radiation and recovering 3-deoxy-1α-acetoxy-precholecalciferol;

thermally promoting isomerization to 3-deoxy-1α-acetoxy-cholecalciferol, hydrolyzing the said compound and recovering 3-deoxy-1α-hydroxycholecalciferol.

* * * * *